US012587121B2

(12) United States Patent
Hoffman et al.

(10) Patent No.:  US 12,587,121 B2
(45) Date of Patent:  Mar. 24, 2026

(54) SYNCHRONIZATION OF MULTIPLE AXES IN A MOTOR DRIVE

(71) Applicant: Rockwell Automation Technologies, Inc., Mayfield Heights, OH (US)

(72) Inventors: Jonathan D. Hoffman, Milwaukee, WI (US); Patrick E. Ozimek, Elm Grove, WI (US); Mark R. Cooper, Eden Prairie, MN (US); Kevin J. Riederer, Glendale, WI (US); John Sandell, Bloomington, MN (US); David M. Brod, Bloomington, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 430 days.

(21) Appl. No.: 18/231,062

(22) Filed: Aug. 7, 2023

(65) Prior Publication Data

US 2025/0055396 A1     Feb. 13, 2025

(51) Int. Cl.
H02P 21/20          (2016.01)
H02P 21/16          (2016.01)
H02P 27/06          (2006.01)

(52) U.S. Cl.
CPC .............. H02P 21/20 (2016.02); H02P 21/16 (2016.02); H02P 27/06 (2013.01)

(58) Field of Classification Search
CPC .... H02P 6/04; H02P 21/20; H02P 5/51; H02P 21/16; H02P 5/74; H02P 27/06;
(Continued)

(56) References Cited

U.S. PATENT DOCUMENTS 6,792,330 B1 *   9/2004   Matsumoto ........ G05B 19/4144
                                                                      700/63
10,158,303 B2   12/2018   Chik et al.
(Continued)

FOREIGN PATENT DOCUMENTS

| CN | 107512200 A | 12/2017 |
| JP | 2003102188 A | 4/2003 |
| JP | 2006187134 A | 7/2006 |

OTHER PUBLICATIONS

Kobayashi (CN 102959) Motor Voltage Conversion Control Apparatus (Year: 2013).*

(Continued)

*Primary Examiner* — Jorge L Carrasquillo
(74) *Attorney, Agent, or Firm* — Boyle Fredrickson, S.C.

(57)          ABSTRACT

A motor controller executes an axis module for each of multiple motors coupled to a shared load. A first control module passes at least one state variable to a second control module without experiencing communication delays between the axis modules. In order to decouple interaction between axes, the first control module determines the desired state variable at a periodic update rate and stores the desired state variable in memory. The first control module provides an indication to the second control module that the desired state variable is available. Within the same period at which the desired state variable is determined, the second control module receives the indication that the desired state variable is available and reads the state variable from the memory of the controller. The second control module executes using the desired state variable to reduce coupling between the two control modules.

14 Claims, 5 Drawing Sheets

(58) Field of Classification Search
CPC ........ G05B 19/416; G05B 2219/50216; G05B
2219/50218
USPC .................................................... 318/400.15
See application file for complete search history.

(56)                      References Cited

U.S. PATENT DOCUMENTS

| | | | |
|---|---|---|---|
| 10,547,254 B2 * | 1/2020 | Bae | F04B 49/20 |
| 10,734,926 B2 * | 8/2020 | Oka | H02P 5/68 |
| 2010/0181955 A1 | 7/2010 | Maeda et al. | |
| 2017/0364077 A1 * | 12/2017 | Sun | H02P 5/56 |
| 2020/0353975 A1 * | 11/2020 | Nakamura | H02P 29/028 |

OTHER PUBLICATIONS

European Search Report for Application No. 24191774.9 dated Dec. 19, 2024 (9 pages).

\* cited by examiner

TIME (SEC)

SYNCHRONIZATION OF MULTIPLE AXES IN A MOTOR DRIVE

BACKGROUND INFORMATION

The subject matter disclosed herein relates to synchronizing control of multiple motors by a single motor drive. More specifically, a single motor drive is configured to execute at least two axis modules, where one of the axis modules requires state data generated by another of the axis modules for operation and the state data is passed between axis modules within the update period during which the data is generated.

As is known to those skilled in the art, motor drives are utilized to control operation of a motor. According to one common configuration, a motor drive includes a DC bus having a DC voltage of suitable magnitude from which an AC voltage may be generated and provided to the motor. The DC voltage may be provided as an input to the motor drive or, alternately, the motor drive may include a rectifier section which converts an AC voltage input to the DC voltage present on the DC bus. The rectifier section may be a passive rectifier with diodes converting the AC voltage to a DC voltage, or the rectifier section may be an active front end with power electronic switching devices, such as metal-oxide semiconductor field-effect transistors (MOSFETs), insulated gate bipolar transistors (IGBTs), thyristors, or silicon-controlled rectifiers (SCRs). The power electronic switching device further includes a reverse conduction power electronic device, such as a free-wheeling diode, connected in parallel across the power electronic switching device. The reverse conduction power electronic device is configured to conduct during time intervals in which the power electronic switching device is not conducting. A controller in the motor drive generates switching signals to selectively turn on or off each switching device to convert the AC voltage to a desired DC voltage on the DC bus. An inverter section is supplied between the DC bus and an output of the motor drive to convert the DC voltage on the DC bus back to an AC voltage having a variable amplitude and frequency to control rotation of the motor. The inverter section includes power electronic switching devices and receives switching signals to selectively turn on and off each switching device to obtain the desired AC voltage.

The motor drive receives a command signal which indicates the desired operation of the motor. The command signal may be a desired position, speed, or torque at which the motor is to operate. The position, speed, and torque of the motor are controlled by varying the amplitude and frequency of the AC voltage applied to the stator. The motor is connected to output terminals of the motor drive, and the controller generates the switching signals to rapidly switch the switching devices on and off at a predetermined switching frequency and, thereby, alternately connects or disconnects the DC bus to the output terminals and, in turn, to the motor. By varying the duration during each switching period for which the output terminal of the motor drive is connected to the DC voltage, the magnitude and/or frequency of the output voltage is controlled. The motor controller utilizes modulation techniques such as pulse width modulation (PWM) to control the switching and to synthesize waveforms having the desired amplitudes and frequencies to follow the command signal and obtain desired operation.

In certain applications, it may be necessary to have multiple motors configured to control a load. The motors may work in tandem, for example, to rotate a common drive shaft or be coupled via separate drive trains to a gantry or other rigid body having sufficient size or weight that requires multiple drives to move the load. Historically, it was known to provide a communication channel between motor drives. A first drive receives the command signal and determines a torque, current, or voltage reference to achieve the desired operation. The first drive transmits the reference to the second drive such that the first drive and the second drive may work in tandem to deliver the required torque, current, or voltage.

However, such communication between drives is not without certain disadvantages. The communication between drives introduces lag between drives. There is some time required on the first motor drive to generate and transmit a communication packet. The second drive must receive and then decode data from the communication packet. The communication delays on a typical network may be in the milliseconds while control of the motors may need to occur at an update rate in the microseconds. In order to accommodate the communication delays, the bandwidth of the controller may be reduced to respond slower to disturbances on the load. The reduced bandwidth allows the reference to be transmitted and the two motor drives to operate together without creating instability in the control system. Alternately, a high-speed communication network or even a dedicated communication channel between motor drives may be established. Such high-speed communications may reduce the communication delay between motor drives, however, these high-speed communication channels typically increase system cost and some delay between motor drives still exists.

Thus, it would be desirable to provide a system for controlling multiple motors in tandem without experiencing communication delays between motor controllers.

BRIEF DESCRIPTION

According to one embodiment of the invention, a system for torque sharing between a plurality of axes within a motor drive includes a clock circuit, a first axis module, and a second axis module. The clock circuit is operative to generate a cycle start signal at a periodic interval, and the cycle start signal indicates a start of each period of a plurality of periods repeated at the periodic interval. The first axis module is within the motor drive and is operative to generate a first voltage reference for desired operation of a first motor operatively connected to the motor drive responsive to the cycle start signal within a first period. The first axis module also generates either an acceleration reference signal or a torque reference signal for desired operation of a second motor operatively connected to the motor drive within the first period. The second axis module is within the motor drive and is operative to receive the acceleration reference signal or the torque reference signal from the first axis module within the first period. The second axis module also generates a second voltage reference for desired operation of the second motor operatively connected to the motor drive responsive to receiving the acceleration reference signal or the torque reference signal within the first period.

According to another embodiment of the invention, a method for torque sharing between a plurality of axes within a motor drive generates a cycle start signal with a clock circuit in the motor drive, where the cycle start signal repeats at a periodic interval. A first axis module executes in the motor drive within a first period responsive to a first cycle start signal. A first voltage reference is generated with the first axis module for desired operation of a first motor operatively connected to the motor drive responsive to the first cycle start signal. Either an acceleration reference signal or a torque reference signal is generated with the first axis module for desired operation of a second motor operatively connected to the motor drive responsive to the first cycle start signal. The acceleration reference signal or the torque reference signal is transmitted from the first axis module to a second axis module within the motor drive within the first period, and a second voltage reference is generated within the first period for desired operation of the second motor with the second axis module responsive to receiving the acceleration reference signal or the torque reference signal.

According to still another embodiment of the invention, a method for sharing data between a plurality of axes within a motor drive includes generating a cycle start signal with a clock circuit in the motor drive, where the cycle start signal repeats at a periodic interval. A first axis module executes in the motor drive within a first period responsive to a first cycle start signal. A first voltage reference is generated for desired operation of a first motor operatively connected to the motor drive with the first axis module responsive to the first cycle start signal. At least one state variable is generated by the first axis module for desired operation of the first motor responsive to the first cycle start signal. A signal is generated indicating the at least one state variable is available for the second axis module. A second voltage reference is generated with the second axis module within the first period for desired operation of the second motor. The second voltage reference is generated as a function of the at least one state variable, and the second voltage reference is generated responsive to receiving the signal indicating the at least one state variable is available for the second axis module.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
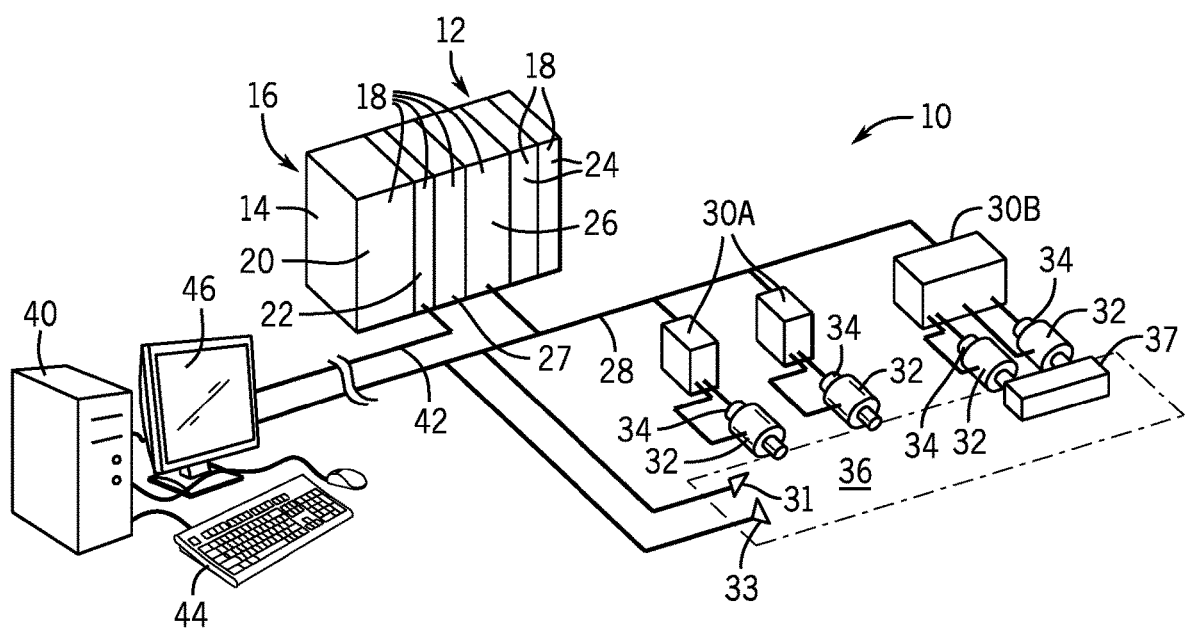
FIG. 1 is an exemplary industrial control system in which embodiments of the present invention are incorporated.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a system for controlling multiple motors in tandem without experiencing communication delays between motor controllers. A single motor drive is configured to control operation of multiple motors. The motor drive includes an axis module for each motor. According to one aspect of the invention, the motor drive may be configured to receive separate commands for each motor, and the corresponding control module for each motor generates a current and/or voltage reference for desired operation of the motor responsive to the separate commands. As each control module generates the current and/or voltage reference, different control loops are executed. Each control loop may regulate a different state variable, such as position, velocity, acceleration, torque, or current. Each control loop may further include multiple state variables, such as a reference variable, a feedback variable, an estimated variable, or an output variable corresponding to the control loop.

When multiple motors are required to control a common load or to control different axes of a machine in which some form of coupling exists between the different axes, operation of one motor impacts operation of the other motor. For example, two motors connected to a common drive shaft each need to produce one half of the total torque required to rotate the drive shaft. If one motor generates less than one half of the total torque, the other motor may generate an additional torque such that the torque output by the second motor is greater than one half of the total torque required. The two motors operate together to maintain the desired torque. According to another example, two axes of a robot are joined by a mechanical link. Motion of a first axis may cause motion of both the first axis and a second axis coupled to the first axis by the mechanical link. While motion of the second axis may occur independently from the first axis at the end of the mechanical link and not cause motion in the first axis, a torque output by the second motor may cause a disturbance to the first motor along the mechanical link as the first motor is regulating the position of the first axis.

In order to decouple interaction between axes, a first control module in the motor drive is configured to pass at least one state variable from the first control module to the second control module. Further, the first control module and the second control module are configured to execute such that communication latency over multiple update cycles between the two control modules is eliminated. The first control module determines the desired state variable at a periodic update rate set within the motor controller. The first control module then stores the desired state variable in memory within the motor controller and provides an indication to the second control module that the desired state variable is available. Within the same period at which the desired state variable is determined, the second control module receives the indication that the desired state variable is available. The second control module reads the state variable from the memory of the controller and executes using the desired state variable. As a result, both the first and second control modules are able to determine a desired current and/or voltage reference within each cycle of a periodic update time, where the second control module is further able to utilize state variable information from the first control module generated within the same cycle to reduce coupling between the two control modules.

Referring initially to FIG. 1, an industrial control system 10 may include an industrial controller 12 which has multiple modules 18 and a backplane, or other communication bus, 16 providing communication between the multiple modules 18. The modules 18 may be installed within a housing or individually on a mounting bracket, such as a DIN rail. The communication bus 16 is typically a backplane coupled between modules 18 via suitable connectors. The modules may include, for example, a power supply module 20, a processor module 22, one or more I/O modules 24, a motion control module 27, and a network module 26. The network module 26, processor module 22, or a combination thereof may communicate on an industrial control network 28, such as ControlNet®, DeviceNet®, or EtherNet/IP®, between the industrial controller 12 and other devices connected to the industrial controller. The network 28 may join with other devices in the controlled machine or process 36, including, for example, actuators 31, controlled by output signals from the industrial controller 12, or sensors 33, providing input signals to the industrial controller. The industrial controller 12 may be, for example, a programmable logic controller (PLC), a programmable automation controller (PAC), or the like. It is contemplated that the industrial controller 12 may include still other modules, such as an axis control module, or additional racks connected via the industrial control network 28. Optionally, the industrial controller 12 may have a fixed configuration, for example, with a predefined number of network and I/O connections.

The industrial control network 28 may join the industrial controller 12 to remote I/O modules (not shown) and one or more remote motor drives 30A, 30B, the latter of which may communicate with corresponding electric motors 32 and position feedback devices 34 to provide for controlled motion of the electric motors 32. The controlled motion of the electric motors, in turn, controls associated industrial machinery or processes 36. A single motor drive 30A and motor may be referred to as an axis of motion. The illustrated embodiment includes two motor drives 30A configured to control an individual motor 32.

An axis of motion may also require multiple motors 32 controlled by a single motor drive 30B. The illustrated embodiment includes one motor drive 30B configured to control two separate motors 32. Both motors 32 controlled by the second motor drive 30B are coupled to a common load 37. In some applications, the common load 37 may be a rigid body coupled to each motor 32 via separate gearboxes. The two motors 32 may operate in a torque sharing mode to provide a required torque to achieve desired motion of the rigid body. In other applications, the common load 37 may be a pair of spools and a web transferred between the spools. The two motors 32 work in tandem to control transfer of a material, such as paper, fabric, wire, or the like between one spool and the other while a manufacturing process typically is performed on the material as it is transferred between spools. According to still another exemplary application, the common load 37 may be a robot. Each motor 32 may control operation of one axis of a robot.

Although each motor 32 controls operation of one axis of the robot, the axes are coupled together by a mechanical link, and motion of one axis causes motion and/or forces to be applied to the other axis. The above examples of a common load 37 are not intended to be limiting. Still other applications of a common load 37 may require multiple motors 32 for control and the multiple motors 32 may be controlled by a single motor drive 30B. Further, two motors 32 are shown connected to the single motor drive 30B for case of illustration. It is contemplated that three or more motors 32 may be connected to a single motor drive 30B.

A configuration computer 40 may communicate with the industrial controller 12 and/or the motor drives 30A, 30B over the industrial control network 28 or via a dedicated communication channel 42, for example, connecting with the processor module 22. The configuration computer 40 may be a standard desktop or laptop computer and include a keyboard 44, display screen 46, and the like to permit the entry and display of data and the operation of a configuration program by a human operator.

Figure 2:
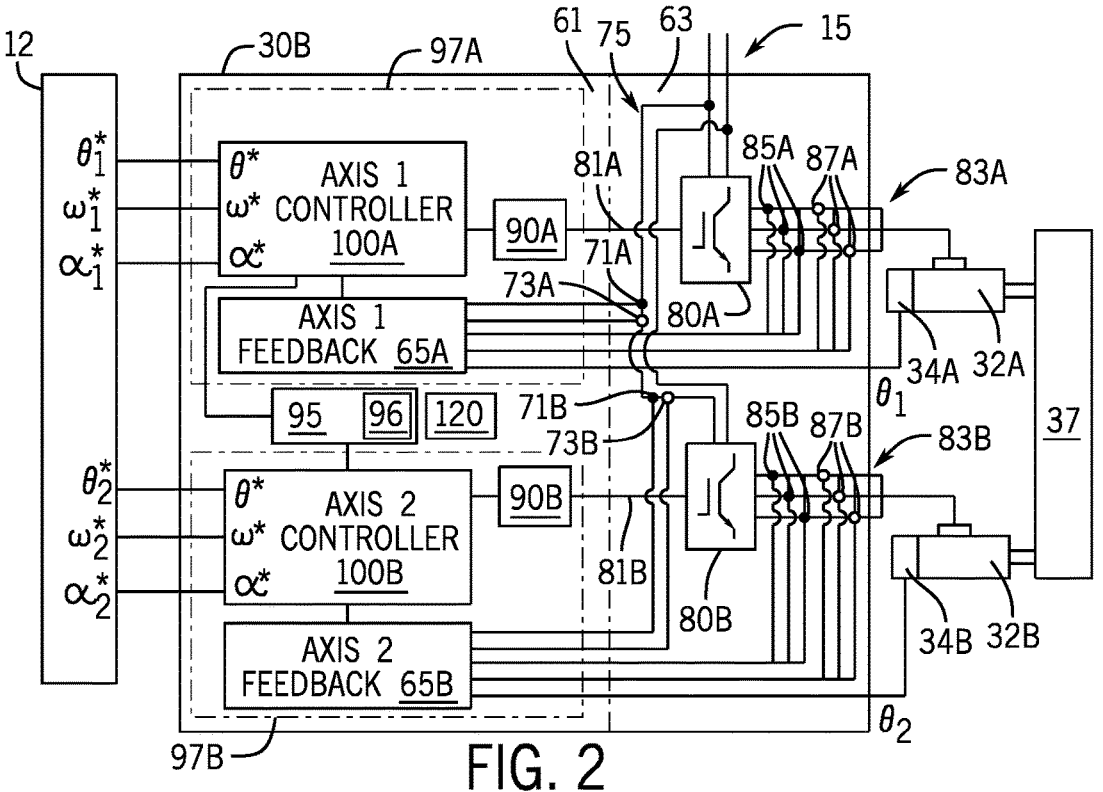
FIG. 2 is a block diagram representation of a motor drive of FIG. 1 including a pair of axis modules.

Turning next to FIG. 2, a motor drive 30B, according to one embodiment of the invention, is configured to control multiple motors 32. The illustrated motor drive 30B includes a power section 63 and a control section 61. The power section 63 includes components typically handling, for example, 200-575 VAC or 200-800 VDC. The power section 63 receives power in one form and utilizes power switching devices to regulate power output to the motor 32 in a controlled manner to achieve desired operation of the motor 32. The control section 61 includes components typically handling, for example 110 VAC or 3.3-50 VDC. The control section 61 includes processing devices, feedback circuits, and supporting logic circuits to receive feedback signals and generate control signals within the motor drive 30B.

According to the illustrated embodiment, the motor drive 30B is configured to receive a DC voltage at an input 15 of the motor drive 30B. The DC voltage is conducted via a shared DC bus 75, where the shared DC bus extends between multiple motor drives 30A, 30B. According to one aspect of the invention, a rectifier module (not shown) is provided which receives a three-phase AC voltage at an input. The rectifier module may include any electronic device suitable for passive or active rectification as is understood in the art. A passive rectifier module may include a set of diodes forming a diode bridge that rectifies the three-phase AC voltage to a DC voltage on the DC bus 75. Optionally, an active rectifier module may include other solid-state devices including, but not limited to, thyristors, silicon-controlled rectifiers (SCRs), or transistors to convert the three-phase AC voltage to a DC voltage for the DC bus 75. Active rectification further allows the potential for bidirectional current flow and regenerative operation between the motor drives 30A, 30B and the AC voltage supply. The DC voltage is present between a positive rail and a negative rail of the DC bus 75. The magnitude of the DC voltage between the negative and positive rails is generally equal to the magnitude of the peak of the AC input voltage or boosted to a value greater than the peak of the AC input voltage. According to another aspect of the invention, each motor drive 30 may include its own rectifier section and may receive the three-phase AC voltage as an input rather than the DC voltage on the DC bus 75. The rectifier section in each motor drive 30 then converts the AC voltage to a DC voltage for use by the corresponding motor drive 30.

The motor drive 30B illustrated in FIG. 2 is configured to control two motors. The DC bus 75 is connected between the input 15 and two inverter sections 80. A first inverter section 80A is configured to control operation of a first motor 32A connected to the motor drive 30B, and a second inverter section 80B is configured to control operation of a second motor 32B connected to the motor drive 30B. The inverter section 80 consists of switching elements, such as transistors, thyristors, or SCRs as is known in the art. The switching elements are connected in pairs between the positive rail of the DC bus 75 and each phase of the output 83 as well as between the negative rail of the DC bus 75 and each phase of the output. Each of the switching elements receives gating signals 81 from a driver module 90 to selectively enable the switching elements and to convert the DC voltage from the DC bus 75 into a controlled three phase output voltage to the motor 32. As illustrated, a first driver module 90A generates a first set of gating signals 81A for the first inverter section 80A, and a second driver module 90B generates a second set of gating signals 81B for the second inverter section 80B. When enabled, each switching element connects the respective positive or negative rail of the DC bus 75 to one phase of the output 83. The switching elements are connected to the output 83 according to the application requirements (e.g., the rating of the motor drive 30B) and may be, for example, a conductive surface on a circuit board to which the switching elements are mounted or a bus bar connected to a terminal from a power module in which the switching elements are contained. The motor drive 30B is then connected to each motor 32A, 32B via a cable including electrical conductors sized according to the application requirements.

The illustrated motor drive 30B includes a first axis module 97A, used to control operation of the first motor 32A, and a second axis module 97B, used to control operation of the second motor 32B. Each axis module 97 includes a controller 100, a feedback circuit 65, and a driver module 90, where the controller 100, feedback circuit 65, and driver module 90 are sub-modules of each axis module 97. The illustrated embodiment is not intended to be limiting and it is understood that various features of each module or sub-module, as discussed below, may be executed by another module and/or various combinations of other modules or sub-modules without deviating from the scope of the invention. The modules may be stored programs executed on one or more processors, logic circuits, or a combination thereof. The axis modules 97 may be implemented, for example, in a microprocessor, application specific integrated circuit (ASIC), field programmable gate array (FPGA), or other such customizable device. As used herein, a reference numeral without a following letter refers to a single element or describes plural elements generally. A reference numeral with a following letter refers to a specific element selected from plural elements. For example, when axis module 97 is utilized, this refers generally to each of the axis modules described herein. When axis module 97A is used, this refers to a first axis module, and when axis module 97B is used, this refers to a second axis module, where the first and second axis modules are separate instances of an axis module 97.

The motor drive 30 also includes a memory device 95 in communication with the axis modules 97. The memory device 95 may include transitory memory, non-transitory memory, persistent memory, or non-persistent memory, or a combination thereof. The memory device 95 is configured to store data and programs, which include a series of instructions executable by each axis module 97. The memory device 95 may be a single device, multiple devices, or incorporated, for example, as a portion of another device such as an application specific integrated circuit (ASIC).

Each axis module 97 is in communication with the memory device 95 to read the instructions and data as required to control operation of the motor drive 30. The memory device 95 may be portioned into multiple segments where a first segment is accessible only by the first axis module 97A, a second segment is accessible only by the second axis module 97B, and a third segment is shared memory 96 accessible by both the first and second axis modules 97A, 97B. The motor drive 30B also includes at least one clock circuit 120. The clock circuit 120 generates clock pulses at one or more predefined frequencies. The clock pulses may be used directly or aggregated to generate periodic cycle start signals at which modules within the motor drive 30 execute.

The motor drive 30B receives at least one reference signal identifying desired operation of the motors 32A, 32B connected to the motor drive 30B. According to the illustrated embodiment, the industrial controller 12 is configured to provide one or more of the following reference signals. The first axis module 97A may receive a first position reference signal ($\theta^*_1$), a first speed reference signal ($\omega^*_1$), a first acceleration reference signal ($\alpha^*_1$), a first torque reference signal ($T^*_1$), or a combination thereof. The second axis module 97B may receive a second position reference signal ($\theta^*_2$), a second speed reference signal ($\omega^*_1$), a second acceleration reference signal ($\alpha^*_1$), a second torque reference signal ($T^*_1$), or a combination thereof. Although multiple reference signals are illustrated for each axis module 97, commonly one input signal is selected and provided to the motor drive 30 for each axis module 97. Some applications, as will be discussed in more detail below, may receive just one reference signal at the motor drive 30B and the motor drive 30B will control operation of both motors 32A, 32B responsive to the single reference signal.

Each axis module 97 includes a feedback circuit 65 configured to receive feedback signals indicating the current operation of the motor drive 30B. The feedback circuit 65 may include, but is not limited to, analog to digital (A/D) converters, buffers, amplifiers, and any other components that would be necessary to convert a feedback signal in a first format to a signal in a second format suitable for use by the controller 100 as would be understood in the art The motor drive 30B may include a voltage sensor 71 and/or a current sensor 73 on the DC bus 75 generating a feedback signal corresponding to the magnitude of voltage and/or current present on the DC bus 75. A single voltage sensor and a single current sensor may be used to provide feedback signals to both the first feedback circuit 65A and the second feedback circuit 65B. Optionally, a first voltage sensor 71A provides a first voltage feedback signal to the first feedback circuit 65A, and a second voltage sensor 71B provides a second voltage feedback signal to the second feedback circuit 65B. Similarly, a first current sensor 73A may provide a first current feedback signal to the first feedback circuit 65A and a second current sensor 73B may provide a second current feedback signal to the second feedback circuit 65B. According to still another embodiment, a single voltage sensor and a single current sensor may provide feedback signals to one feedback circuit 65, where the feedback signals are provided from the feedback circuit to both controllers 100A, 100B.

The motor drive 30B may also include one or more voltage sensors 85 and/or current sensors 87 on the output phase(s) of the inverter sections 80 generating a feedback signal corresponding to the magnitude of voltage and/or current present between the inverter section 80 and the output 83 of the motor drive. According to the illustrated embodiment, a first set of voltage sensors 85A and a first set of current sensors 87A provide feedback signals to the first feedback circuit 65A corresponding to the voltage and current, respectively, present at the output of the first inverter section 80A. A second set of voltage sensors 85B and a second set of current sensors 87B provide feedback signals to the second feedback circuit 65B corresponding to the voltage and current, respectively, present at the output of the second inverter section 80B. A position feedback device 34 may be connected to each motor 32 and operable to generate a position feedback signal, $\theta$, corresponding to the angular position of the corresponding motor 32. A first position feedback device 34A is connected to the first motor 32A and provides a first position feedback signal, $\theta_1$, to the first feedback circuit 65A. A second position feedback device 34B is connected to the second motor 32B and provides a second position feedback signal, $\theta_2$, to the second feedback circuit 65B. The motor drive 30B includes inputs configured to receive the position feedback signals from the position feedback devices 34. It is contemplated that the input may be configured to receive a sinusoidal feedback signal, a square wave, a digital pulse train, a serial communication data packet, or a combination thereof according to the configuration of the position feedback devices 34.

The controllers 100 utilize the feedback signals and the reference signals to control operation of the corresponding inverter section 80 to generate an output voltage having a desired magnitude and frequency for each motor 32. The feedback signals are processed by the feedback circuits 65 and converted, as necessary, to signals for the controllers 100.

Figure 3:
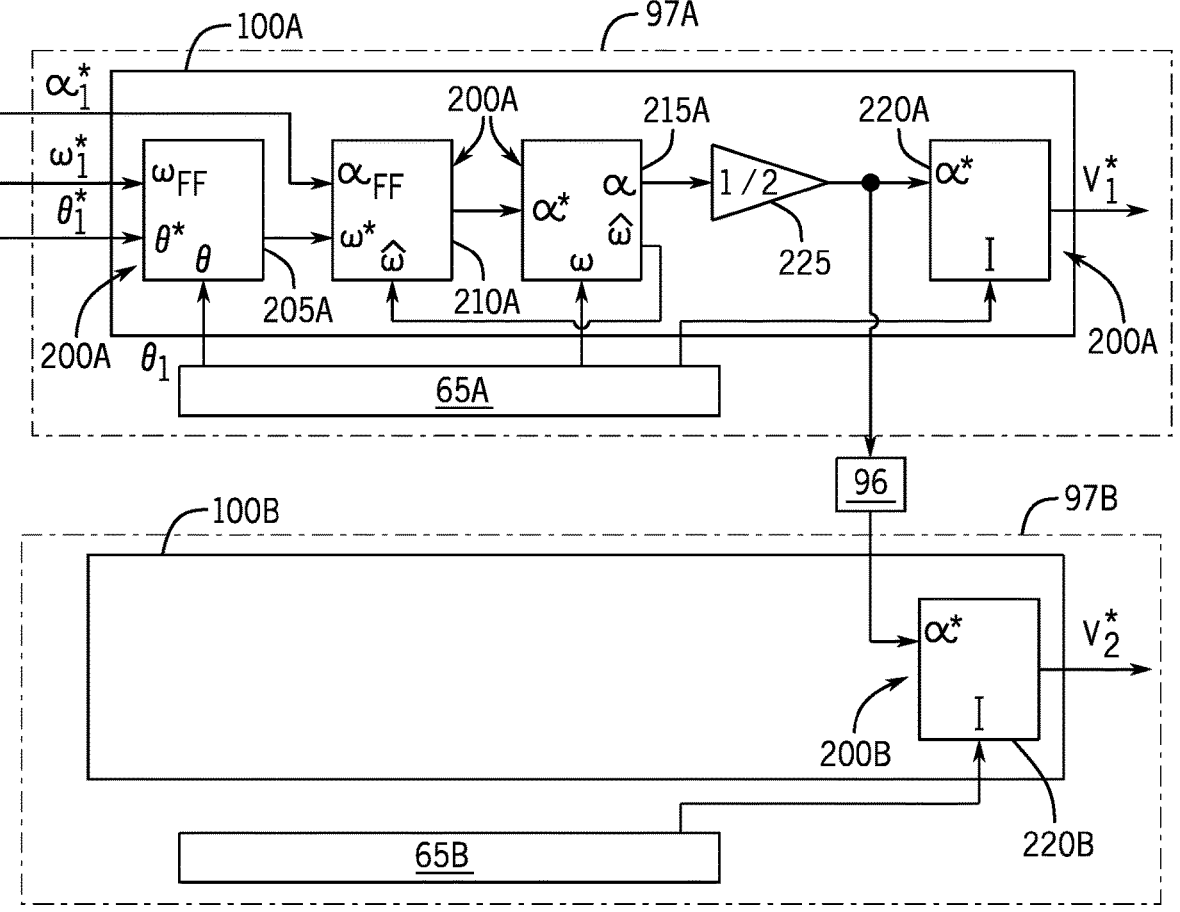
FIG. 3 is a block diagram representation of the axis modules of FIG. 2 according to one embodiment of the present invention.

With reference also to FIG. 3, each controller 100 includes one or more control loops 200A. According to the illustrated embodiment, the first controller 100A includes a position loop controller 205A, a velocity loop controller 210A, an acceleration loop controller 215A, and a current regulator 220A. The second controller 100B includes a current regulator 220B. The first controller 100A receives the first position reference signal ($\theta^*_1$), the first speed reference signal ($\omega^*_1$), and the first acceleration reference signal ($\alpha^*_1$) as input signals. The first position reference signal ($\theta^*_1$) is provided to the position loop controller 205A as a command signal, and the first speed reference signal ($\omega^*_1$) is provided to the position loop controller 205A as a feedforward signal. Within the position loop controller 205A, the first position reference signal ($\theta^*_1$) is compared to a position feedback signal ($\theta_1$) corresponding to the angular position of the first motor 32A. The output of the comparison between the position command signal and the position feedback signal is a position error signal. The position loop controller 205A may then include a proportional and an integral (PI) controller which receives the position error signal as an input. Optionally, the position loop controller 205A may include just a proportional (P) controller or further include a derivative (D) controller. Each of the proportional (P), integral (I), and/or derivative (D) controllers of the position loop controller 205A includes a controller gain value. The controller gain values are commonly referred to as a proportional gain (Kpp), integral gain (Kpi), and a derivative gain (Kpd). The output of the position loop controller 205A is a velocity reference signal ($\omega^*$).

The velocity reference signal ($\omega^*$) is provided to the velocity loop controller 210A as a command signal, and the first acceleration reference signal ($\alpha^*_1$) is provided to the velocity loop controller 210A as a feedforward signal. Within the velocity loop controller 210A, the velocity reference signal ($\omega^*$) is compared to a velocity feedback signal.

In the illustrated embodiment, an observer executing in the acceleration loop controller 215A generates an estimated velocity feedback signal ($\hat{\omega}$) which is fed back to the velocity loop controller as the velocity feedback signal. Optionally, the velocity feedback signal may be determined by taking a derivative of the position feedback signal ($\theta_1$). The output of the comparison between the velocity reference signal and the velocity feedback signal is a velocity error signal. The velocity loop controller 210A may then include a proportional and an integral (PI) controller which receives the velocity error signal as an input. Optionally, the velocity loop controller 210A may be just a proportional (P) controller or further include a derivative (D) controller. Each of the proportional (P), integral (I), and/or derivative (D) controllers of the velocity loop controller 210A includes a controller gain value. The controller gain values are commonly referred to as a proportional gain (Kvp), integral gain (Kvi), and a derivative gain (Kvd). The output of the velocity loop controller 210A is an acceleration reference signal ($\alpha^*$).

The acceleration reference signal ($\alpha^*$) is provided to the acceleration loop controller 215A as a command signal. The acceleration loop controller also receives a velocity feedback signal ($\omega$) determined, for example, by taking a derivative of the position feedback signal ($\theta_1$). The acceleration loop controller may include or be entirely comprised of a load observer. As indicated above, the load observer determines an estimated velocity feedback signal ($\hat{\omega}$) which is provided to the velocity loop controller. The load observer may also determine an estimated acceleration disturbance which is added to the acceleration reference signal ($\alpha^*$) and output from the acceleration loop controller 215A as a modified acceleration reference to obtain desired operation of the load 37 controlled by the motors 32A, 32B.

For the embodiment illustrated in FIG. 3, both axis modules 97A, 97B of the motor drive 30B execute in a torque sharing operating mode to control a load 37 connected to the motors 32A, 32B. The output of the acceleration loop controller 215A is provided to a gain block 225. According to the illustrated embodiment, the gain block 225 divides the output in half. In the illustrated embodiment, each motor 32A, 32B provides one half of the torque required to drive the load 37. If three or more motors are required to drive a load, the gain block 225 may be set to a value of one over "n", where "n" equals the number of motors required to drive the load. According to still another embodiment, the motors may be different sizes and configured to provide varying proportions of the torque required to drive the load. In such an application, the gain block 225 may be configured to divide the output of the acceleration loop controller 215A into uneven proportions, according to the amount of torque each motor is configured to provide. With reference again to FIG. 3, where two motors equally drive the load 37, one half of the modified acceleration reference signal is provided as an input to the first current regulator 220A in the first controller 100A, and one half of the modified acceleration reference signal is provided as an input to the second current regulator 220B in the second controller 100B. As is understood in the art, angular acceleration is proportional to torque and, more specifically, torque is equal to inertia times the angular acceleration. The acceleration reference signal is multiplied by the inertia to obtain a torque reference signal. The torque reference signal is, in turn, divided by a torque constant for the motor 32. The torque constant of the motor defines an amount of torque generated as a result of the current provided to the motor. Dividing the torque reference signal by the torque constant yields a current reference. The current reference is compared to a current feedback signal to generate a current error signal. The current regulator 220A may then include a proportional and an integral (PI) controller which receives the current error signal as an input. Optionally, the current regulator 220A may be just a proportional (P) controller or further include a derivative (D) controller. Each of the proportional (P), integral (I), and/or derivative (D) controllers of the current regulator 220A includes a controller gain value. The controller gain values are commonly referred to as a proportional gain (Kip), integral gain (Kii), and a derivative gain (Kid). The output of the current regulator 220A is a voltage reference, $V_1^*$. The voltage reference, $V_1^*$, is provided as an input to the driver module 90 and is used to generate the gating signals 81 discussed above.

According to another aspect of the invention, the acceleration loop controller 215A may be configured to output either a torque reference signal or a current reference signal. As discussed above, the torque reference signal is determined by multiplying the acceleration reference signal by the inertia and the current reference signal is determined by dividing the torque reference signal by the torque constant. One or both of these operations, discussed above with respect to the current regulator 220A, may be performed in the acceleration loop controller 215A to output the torque reference signal or the current reference signal.

Figure 4:
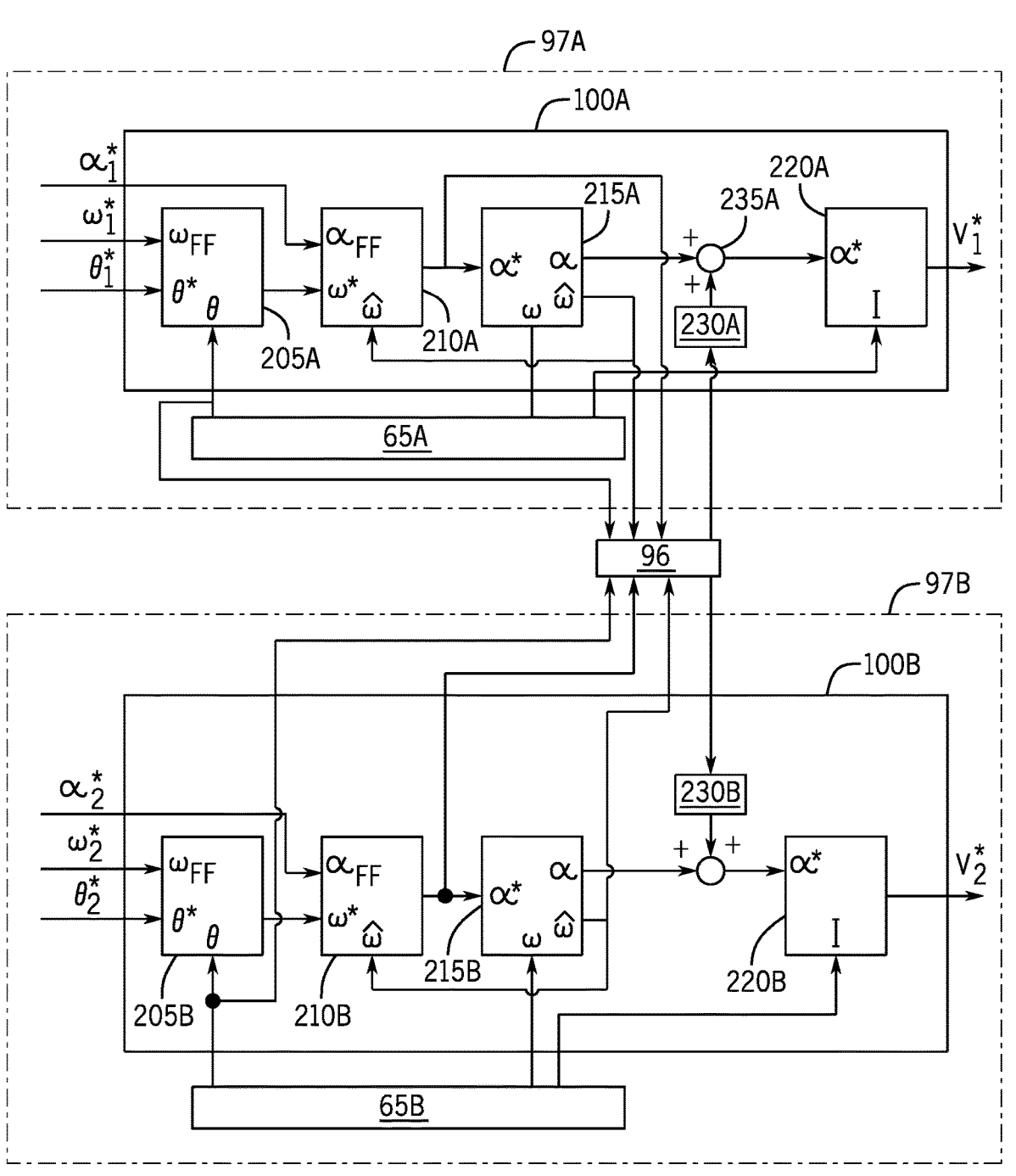
FIG. 4 is a block diagram representation of the axis modules of FIG. 2 according to another embodiment of the present invention.
Figure 6:
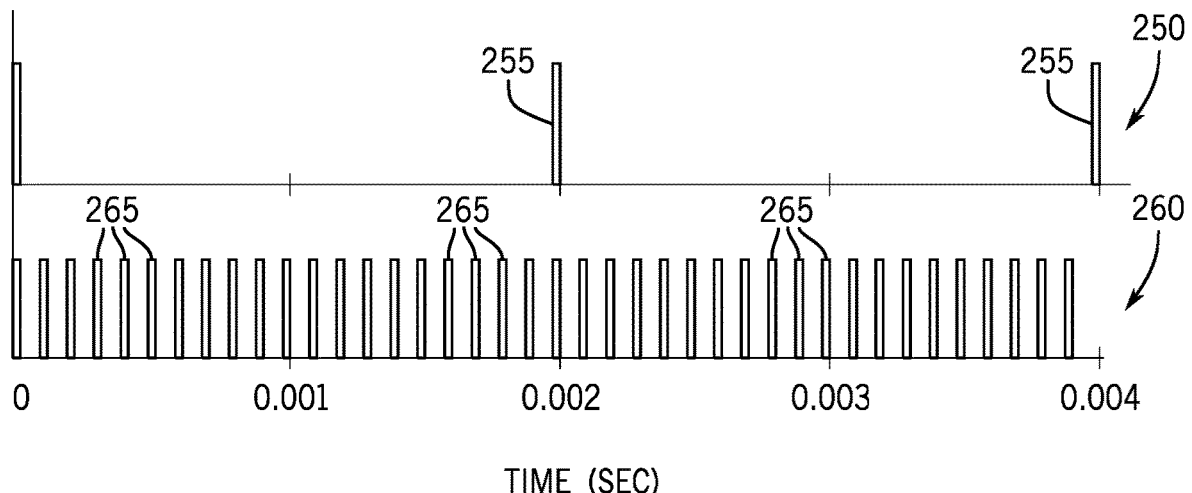
FIG. 6 is a timing diagram illustrating two different periodic update rates within a motor drive of FIG. 1.

In operation, the motor drive 30B, executing a first axis module 97A and a second axis module 97B, synchronizes operation of a first motor 32A and a second motor 32B. Each of the loop controllers 205, 210, 215, 220 in the corresponding axis module 97 execute at a periodic interval. With reference also to FIG. 6, the clock circuit 120 may be configured to generate multiple update periods at different frequencies. Clock start signals, indicating the start of each period, are repeated at a periodic interval. A first update period 250 has clock start signals 255 generated at two millisecond (2 ms) intervals. A second update period 260 has clock start signals 265 generated at one hundred microsecond (100 μs) intervals. The motor drive 30B may include still other periodic update intervals. The clock start signals may be an interrupt signal generated by a specified time passing, where an interrupt service routine executes a desired set of instructions during each periodic interval in response to the interrupt signal being generated. Optionally, an internal status flag may be set by the clock circuit at the start of each periodic interval. Each of the update periods 250, 260 may be configurable in duration, and the duration or frequency of each update period may be set by a parameter stored in the memory device 95 of the motor drive 30. Further, a portion of the loop controllers 205, 210, 215, 220 may execute during one update period and another portion of the controllers may execute during another update period. However, corresponding loop controllers in the first and second axis modules 97A, 97B execute during the same update period. With reference also to FIG. 4, the position loop controllers 205A, 205B; velocity loop controllers 210A, 210B; and the acceleration loop controllers 215A. 215B in the first and second axis modules 97A, 97B, for example, may each execute in the first update period 250. The current regulators 220A, 220B in the first and second axis modules 97A, 97B may execute in the second update period 260.

According to a first embodiment of the invention, the motor drive 30B is configured to execute in a torque sharing operating mode. With reference again to FIGS. 2 and 3, the first axis module 97A receives a command for desired operation of a load 37 driven by two motors 32A, 32B. The command includes the first position reference signal ($\theta^*_1$), the first speed reference signal ($\omega^*_1$), and the first acceleration reference signal ($\alpha^*_1$) as input signals. Each of the input signals are provided to either the position loop controller 205A or velocity loop controller 210A as discussed above. The position, velocity, and acceleration loop controllers 205A, 210A, 215A execute to determine an initial acceleration reference signal required for the load 37 to follow the commanded input signals. Because two motors 32A, 32B are being used to evenly drive the load 37, the initial acceleration reference signal is divided by two at gain block 225. A modified acceleration reference signal, corresponding to one-half of the initial acceleration reference signal, is provided to the current regulators 220A, 220B for each axis module 97A, 97B to achieve desired operation of the motors.

The first current regulator 220A uses the modified acceleration reference signal to determine a first voltage reference, $V_1^*$, corresponding to desired operation of the first motor 32A. This first voltage reference is provided to a first driver module 90A which generates the gating signals 81A for the first inverter section 80A to output the desired voltage to the first motor 32A.

The first axis module 97A also transmits the modified acceleration reference signal to the second axis module 97B within the same periodic interval in which the modified acceleration reference signal is generated. The first axis module 97A utilizes the cycle start signals 255 or 265 from the corresponding update interval in which each loop controller 205A, 210A, 215A is to be executed to begin execution of the respective controllers. After generating the modified acceleration reference signal, the first axis module 97A transmits the modified acceleration reference signal to the second axis module 97B. According to one aspect of the invention, the first axis module 97A and the second axis module 97B are executed on a common processor. The first axis module 97A stores the modified acceleration reference signal in memory, such as cache memory, and generates a signal to the second axis module 97B indicating the modified acceleration reference signal is available for execution. According to another aspect of the invention, the first axis module 97A and the second axis module 97B are executing on separate processors or on separate cores of a multi-core processor. A dedicated communication channel may be provided between on a circuit board between the processors or as a dedicated communication channel within the multi-core processor for communication between the first and second axis modules 97A, 97B. Optionally, shared memory 96 is available, where the shared memory is accessible by both processors or both cores of the multi-core processor, such that the first axis module 97A and the second axis module 97B are both able to read from and write to the shared memory 96. A memory manager is provided to manage access to the shared memory by both the first and second axis modules. The memory manager may generate a signal indicating memory is unavailable for access by one of the axis modules and/or when the memory is again available for access by the axis modules. A dedicated memory location may be provided for transmitting data between the two axis modules, and the second axis module 97B may monitor the write access by the first axis module 97A to detect when the shared memory 96 has been written and, therefore, detect when a new modified acceleration reference signal is available for execution. Upon identifying that the new modified acceleration reference signal has been generated within this period by the first axis module 97A, the second axis module provides the modified acceleration reference signal to the second current regulator 220B. The second current regulator 220B uses the modified acceleration reference signal to determine a second voltage reference, $V_2^*$, corresponding to desired operation of the second motor 32B. This second voltage reference is provided to a second driver module 90B which generates the gating signals 81B for the second inverter section 80B to output the desired voltage to the first motor 32B.

Thus, the first axis module 97A is triggered to begin execution responsive to a cycle start signal at the beginning of a periodic interval. The first axis module 97A executes during a first portion of the periodic interval and generates the modified acceleration reference signal. The second axis module 97B is configured to execute the current regulator 220B during a second portion of the periodic interval responsive to a signal indicating the modified acceleration reference signal is available. However, both the first and second axis modules 97A, 97B generate the respective voltage reference signals, $V_1^*$ and $V_2^*$, within a single periodic interval such that there is minimal lag between the two axes.

According to another embodiment of the invention, the motor drive 30B is configured to execute in a disturbance decoupling operating mode. With reference next to FIG. 4, both the first axis module 97A and the second axis module 97B receive separate commands, corresponding to desired operation of a load 37. The load 37 may be, for example, a robot where each motor 32A, 32B is configured to control one axis of the robot. Operation of each motor 32, however, causes some disturbance force to be applied to another axis of the robot as a result of the mechanical linkages extending between joints of the robot. The command for the first axis module 97A includes the first position reference signal ($\theta^*_1$), the first speed reference signal ($\omega^*_1$), and the first acceleration reference signal ($\alpha^*_1$) as input signals. Each of the input signals are provided to either the first position loop controller 205A or first velocity loop controller 210A as discussed above. The command for the second axis module 97B includes a second position reference signal ($\theta^*_2$), a second speed reference signal ($\omega^*_2$), and a second acceleration reference signal ($\alpha^*_2$) as input signals. Each of the input signals are provided to either the second position loop controller 205B or the second velocity loop controller 210B in a manner similar to that described for the first axis module 97A. The position, velocity, and acceleration loop controllers 205A, 205B, 210A, 210B, 215A, 215B in each axis module 97A, 97B execute to determine an initial acceleration reference signal required for the load 37 to follow the commanded input signals.

In order to provide decoupling between axes, the first axis module 97A includes a first decoupling module 230A and the second axis module 97B includes a second decoupling module 230B. During execution of the loop controllers 205, 210, 215, each axis module 97 receives feedback signals and generates intermediate state variables. In order to decouple motion between axes, at least a portion of the feedback signals and/or intermediate state variables from one axis module is provided to the other axis module. According to the embodiment illustrated in FIG. 4, each axis module utilizes a position feedback signal, an estimated velocity signal, and an acceleration reference signal from the other axis module. During each periodic interval in which the first position loop controller 205A, the first velocity loop controller 210A, and the first acceleration loop controller 215A are executed, the first axis module 97A transmits the position feedback signal, $\theta$, from the first position feedback device 34A, the estimated velocity feedback signal ($\hat{\omega}$), from the first acceleration loop controller 215A, and the acceleration reference signal ($\alpha^*$) output from the first velocity loop controller 210A to the second axis module 97B. Similarly, during the same periodic interval in which the second position loop controller 205B, the second velocity loop controller 210B, and the second acceleration loop controller 215B are executed, the second axis module 97B transmits the position feedback signal, $\theta$, from the second position feedback device 34B, the estimated velocity feedback signal ($\hat{\omega}$), from the second acceleration loop controller 215B, and the acceleration reference signal ($\alpha^*$) output from the second velocity loop controller 210B to the first axis module 97A.

Within the same periodic cycle in which each of the feedback signals are read and/or the intermediate state variables are generated, the signals are provided to the other axis module 97. As discussed above, the first and second axis modules 97A, 97B may directly transmit data between modules or may utilize shared memory 96, accessible by each axis module, to transmit data between the modules.

Also within the same periodic cycle in which each of the feedback signals are read and/or the intermediate state variables are generated, each decoupling module utilizes the signals to determine an acceleration feedforward signal. Upon identifying that the intermediate state variables have been generated and are available from the second axis module 97B, the first decoupling module 230A reads the stored values of the position feedback signal, $\theta$, from the second position feedback device 34B, the estimated velocity feedback signal ($\hat{\omega}$), from the second acceleration loop controller 215B, and the acceleration reference signal ($\alpha^*$) output from the second velocity loop controller 210B and determines a first acceleration feedforward signal. The first acceleration feedforward signal is added to the first acceleration reference signal output from the first acceleration loop controller 215A at a first summing junction 235A. The output of the first summing junction 235A is a modified acceleration reference signal provided to the first current regulator 220A and used to determine the first voltage reference, $V_1^*$, corresponding to desired operation of the first motor 32A.

Similarly, after identifying that the intermediate state variables have been generated and are available from the first axis module 97A, the second decoupling module 230B reads the stored values of the position feedback signal, $\theta$, from the first position feedback device 34A, the estimated velocity feedback signal ($\hat{\omega}$), from the first acceleration loop controller 215A, and the acceleration reference signal ($\alpha^*$) output from the first velocity loop controller 210A and determines a second acceleration feedforward signal. The second acceleration feedforward signal is added to the second acceleration reference signal output from the second acceleration loop controller 215B at a second summing junction 235B. The output of the second summing junction 235B is a modified acceleration reference signal provided to the second current regulator 220B and used to determine the second voltage reference, $V_2^*$, corresponding to desired operation of the second motor 32B. Both the first and second axis modules 97A, 97B generate the respective voltage reference signals, $V_1^*$ and $V_2^*$, using the state variables from the other axis module within the same periodic interval in which the signals are generated such that there is no lag in the decoupling modules 230 reducing interaction between the two axes.

Figure 5:
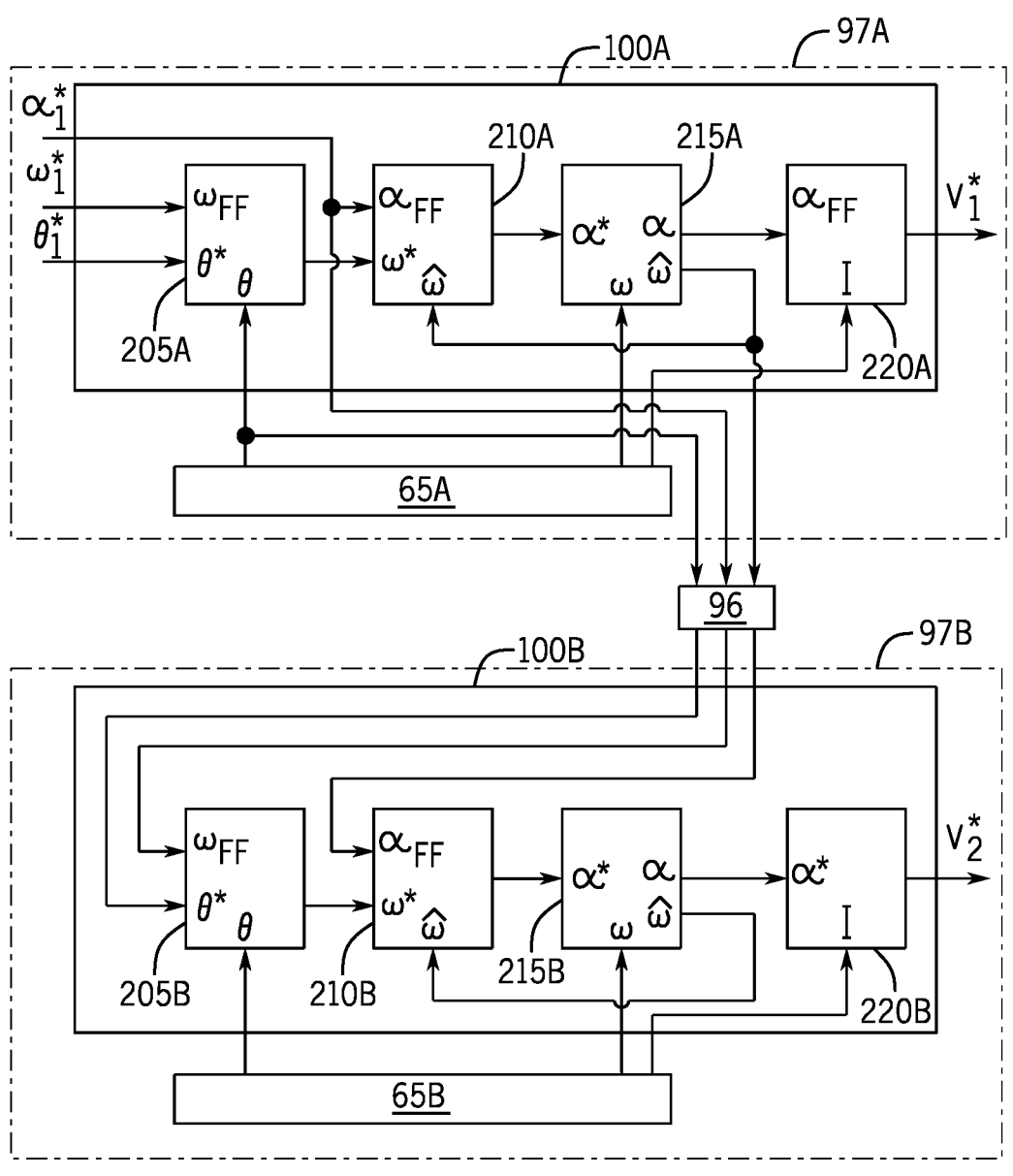
FIG. 5 is a block diagram representation of the axis modules of FIG. 2 according to another embodiment of the present invention.

According to still another embodiment of the invention, the motor drive 30B is configured to execute in a leader-follower operating mode. With reference next to FIG. 5, the first axis module 97A receives the command for desired operation of the first motor 32A. With a leader-follower configuration, the load 37 may be a common load driven by both motors. In some applications, the load 37 corresponds to a process where operation between the first and second motors 32A, 32B is tightly synchronized. For example, the first motor 32A may rotate at a given speed and the second motor 32B may need to rotate at twice the speed of the first motor 32B. Alternately, the second motor 32B may need to execute a cyclic pattern, such as rotating forward a certain distance and rotating in reverse that distance during each rotation of the first motor 32A. The command includes the first position reference signal ($\theta^*_1$), the first speed reference signal ($\omega^*_1$), and the first acceleration reference signal ($\alpha^*_1$) as input signals. Each of the input signals are provided to either the position loop controller 205A or velocity loop controller 210A as discussed above. The position, velocity, and acceleration loop controllers 205A, 210A, 215A execute to determine an acceleration reference signal required for the load 37 to follow the commanded input signals. The acceleration reference signal is, in turn, provided to the current regulator 220A for the first axis module 97A, and a first voltage reference, $V_1^*$, corresponding to desired operation of the first motor 32A, is generated by the first current regulator 220A.

For operation in a leader-follower operating mode, the second motor 32B does not receive an independent command, but rather, follows operation of the first motor 32A. During execution of the loop controllers 205A, 210A, 215A, in the first axis module 97A, feedback signals are received and intermediate state variables are generated. The first axis module 97A transmits signals received and/or determined within one cycle of the periodic interval to the second axis module 97B. These signals are received by the second axis module 97B and used during the same periodic interval to generate a second voltage reference, $V_2^*$, corresponding to desired operation of the second motor 32B. According to the illustrated embodiment, the first axis module 97A transmits the position feedback signal, $\theta$, from the first position feedback device 34A; the estimated velocity feedback signal ($\hat{\omega}$), from the first acceleration loop controller 215A; and the first acceleration reference signal ($\alpha^*_1$), received as part of the command signal, to the second axis module 97B. As discussed above, the first and second axis modules 97A, 97B may directly transmit data between modules or may utilize shared memory 96, accessible by each axis module, to transmit data between the modules.

Upon detecting that the data from the first axis module 97A is available, the second axis module 97B reads the data from the first axis module 97A which is used as command signals for desired operation of the second motor 32B. The position feedback signal, $\theta$, from the first position feedback device 34A is used to generate the command signal to the second position loop controller 205B. As discussed above, the second motor 32B may be configured to directly follow the first motor 32A. However, the second motor 32B may also be configured to rotate at a different ratio, such as two-to-one, or according to a cyclic pattern during each rotation of the first motor 32A. The second controller 100B converts the position signal, $\theta$, from the first position feedback device 34A to the desired position command for the second motor 32B and provides the desired position command to the second position loop controller 205B. The estimated velocity feedback signal ($\hat{\omega}$), from the first acceleration loop controller 215A, is provided as the command signal to the second velocity loop controller 210B, and the first acceleration reference signal ($\alpha^*_1$) is provided as a feedforward signal to the second velocity loop controller 210B. The position, velocity, and acceleration loop controllers 205B, 210B, 215B execute to determine an acceleration reference signal required for the second motor 32B to follow the commanded input signals. The acceleration reference signal is, in turn, provided to the current regulator 220B for the second axis module 97B, and a first voltage reference, $V_2^*$, corresponding to desired operation of the second motor 32B, is generated by the second current regulator 220B. Both the first and second axis modules 97A, 97B generate the respective voltage reference signals, $V_1^*$ and $V_2^*$, within the same periodic interval in which the signals are received and/or determined such that there is minimal lag in the leader-follower operation by the first and second axis modules.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A system for torque sharing between a plurality of axes within a motor drive, the system comprising:

a clock circuit operative to generate a cycle start signal at a periodic interval, the cycle start signal indicating a start of each period of a plurality of periods repeated at the periodic interval;

a memory device in communication with a first axis module and a second axis module, wherein the memory device includes a shared memory segment accessible by both the first axis module and the second axis module;

the first axis module within the motor drive operative to:

generate a first voltage reference for operation of a first motor operatively connected to the motor drive responsive to the cycle start signal within a first period, and generate either an acceleration reference signal or a torque reference signal for operation of a second motor operatively connected to the motor drive within the first period; and the second axis module within the motor drive operative to:

monitor a write access by the first axis module to detect when the shared memory segment has been written to detect when the acceleration reference signal or the torque reference signal is available, read the acceleration reference signal or the torque reference signal generated by the first axis module from the shared memory segment within the first period, and generate a second voltage reference for operation of-the second motor operatively connected to the motor drive responsive to receiving the acceleration reference signal or the torque reference signal within the first period.

2. The system of claim 1, wherein the first axis module is further operative to:

generate an initial acceleration reference signal or an initial torque reference signal for operation of a load driven by both the first motor and the second motor, generate the first voltage reference as a first portion of the initial acceleration reference signal or the initial torque reference signal for operation of the load, and set the acceleration reference signal or the torque reference signal for operation of the second motor equal to a second portion of the initial acceleration reference signal or the initial torque reference signal for operation of the load, where the sum of the first portion and the second portion equals the initial acceleration reference signal or the initial torque reference signal.

3. The system of claim 1, wherein:

the first axis module is operative to generate the first voltage reference and to generate either the acceleration reference signal or the torque reference signal within a first portion of the first period; and the second axis module is further operative to receive the acceleration reference signal or the torque reference signal and to generate the second voltage reference within a second portion of the first period, the second portion subsequent to the first portion.

4. The system of claim 1, wherein:

the first axis module is operative to execute a plurality of first instructions to:

determine the first voltage reference, to generate either the acceleration reference signal or the torque reference signal, generate a signal indicating the acceleration reference signal or the torque reference signal has been generated within the first period, and the first axis module is triggered to periodically execute the plurality of first instructions responsive to the cycle start signal; and the second axis module is operative to execute a plurality of second instructions to:

receive the signal indicating the acceleration reference signal or the torque reference signal has been generated within the first period, and generate the second voltage reference within the first period after receiving the signal indicating the acceleration reference signal or the torque reference signal has been generated.

5. The system of claim 1, further comprising a shared memory manager, wherein the shared memory manager generates a signal when the first axis module writes the acceleration reference signal or the torque reference signal to the shared memory segment and wherein the second axis module reads the acceleration reference signal or the torque reference signal after detecting the signal generated by the shared memory manager.

6. A method for torque sharing between a plurality of axes within a motor drive, the method comprising the steps of:

generating a cycle start signal with a clock circuit in the motor drive, wherein the cycle start signal repeats at a periodic interval;

executing a first axis module in the motor drive within a first period responsive to a first cycle start signal;

generating a first voltage reference with the first axis module for operation of a first motor operatively connected to the motor drive responsive to the first cycle start signal;

generating either an acceleration reference signal or a torque reference signal with the first axis module for operation of a second motor operatively connected to the motor drive responsive to the first cycle start signal;

monitoring, by a second axis module in the motor drive, a write access by the first axis module to detect when a shared memory segment has been written to detect when the acceleration reference signal or the torque reference signal is available;

reading the acceleration reference signal or the torque reference signal generated by the first axis module from the shared memory segment with the second axis module within the first period; and generating a second voltage reference within the first period for operation of the second motor with the second axis module responsive to receiving the acceleration reference signal or the torque reference signal.

7. The method of claim 6, further comprising the step of:

generating either an initial acceleration reference signal or an initial torque reference signal for operation of a load driven by both the first motor and the second motor, the first voltage reference is generated as a first portion of the initial acceleration reference signal or the initial torque reference signal for operation of the load, and the acceleration reference signal or the torque reference signal for desired operation of the second motor is set equal to a second portion of the initial acceleration reference signal or the initial torque reference signal for operation of the load, where the sum of the first portion and the second portion equals the initial acceleration reference signal or the initial torque reference signal.

8. The method of claim 6, wherein:

the first axis module is operative to generate the first voltage reference and to generate either the acceleration reference signal or the torque reference signal within a first portion of the first period; and the second axis module is further operative to receive the acceleration reference signal or the torque reference signal and to generate the second voltage reference within a second portion of the first period, the second portion subsequent to the first portion.

9. The method of claim 6, further comprising the steps of:

generating a signal indicating the acceleration reference signal or the torque reference signal has been generated within the first period; and receiving the signal indicating the acceleration reference signal or the torque reference signal has been generated with the second axis module, wherein the second voltage reference is generated within the first period after receiving the signal indicating the acceleration reference signal or the torque reference signal has been generated.

10. The method of claim 6 further comprising the steps of:

generating a signal with a shared memory manager when the first axis module writes the acceleration reference signal or the torque reference signal to the shared memory segment; and detecting the signal generated by the shared memory manager, wherein the second axis module reads the acceleration reference signal or the torque reference signal after detecting the signal generated with the shared memory manager.

11. A method for sharing data between a plurality of axes within a motor drive, the method comprising the steps of:

generating a cycle start signal with a clock circuit in the motor drive, wherein the cycle start signal repeats at a periodic interval;

executing a first axis module in the motor drive within a first period responsive to a first cycle start signal;

generating a first voltage reference for operation of a first motor operatively connected to the motor drive with the first axis module responsive to the first cycle start signal;

generating either an acceleration reference signal or a torque reference signal with the first axis module for operation of a second motor operatively connected to the motor drive responsive to the first cycle start signal;

generating a signal indicating either the acceleration reference signal or the torque reference signal is available for a second axis module;

monitoring, by a second axis module in the motor drive, a write access by the first axis module to detect when a shared memory segment has been written to detect when the acceleration reference signal or the torque reference signal is available;

reading the acceleration reference signal or the torque reference signal from the shared memory segment with the second axis module within the first period; and generating a second voltage reference with the second axis module within the first period for operation of the second motor with the second axis module responsive to reading the acceleration reference signal of the torque reference signal.

12. The method of claim 11, further comprising the step of generated generating a signal by a memory manager indicating a new value has been written to the shared memory segment.

13. The method of claim 11, wherein:

the first axis module is operative to generate the first voltage reference and to generate either the acceleration reference signal or the torque reference signal within a first portion of the first period; and the second axis module is further operative to read either the acceleration reference signal or the torque reference signal and to generate the second voltage reference within a second portion of the first period, the second portion subsequent to the first portion.

14. The method of claim 13, wherein:

the second axis module includes a first portion and a second portion, the first portion of the second axis module is operative to execute responsive to the first cycle start signal, and the second portion of the second axis module is operative to read either the acceleration reference signal or the torque reference signal and to generate the second voltage reference within the second portion of the first period.

* * * * *